(12) United States Patent
Danilov et al.

(10) Patent No.: US 10,572,174 B2
(45) Date of Patent: Feb. 25, 2020

(54) DATA LIFETIME-AWARE MIGRATION

(71) Applicant: EMC IP Holding Company LLC, Hopkinton, MA (US)

(72) Inventors: Mikhail Danilov, Saint Petersburg (RU); Maksim Vazhenin, Saint Petersburg (RU)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/010,228

(22) Filed: Jun. 15, 2018

(65) Prior Publication Data

US 2019/0384525 A1 Dec. 19, 2019

(51) Int. Cl.
*G06F 3/00* (2006.01)
*G06F 3/06* (2006.01)
*G06N 7/00* (2006.01)

(52) U.S. Cl.
CPC .......... *G06F 3/0649* (2013.01); *G06F 3/0604* (2013.01); *G06F 3/0683* (2013.01); *G06N 7/005* (2013.01)

(58) Field of Classification Search
None
See application file for complete search history.

(56) References Cited

U.S. PATENT DOCUMENTS

| 5,664,187 A | * | 9/1997 | Burkes | G06F 3/0601 |
| | | | | 707/999.2 |
| 2007/0106710 A1 | * | 5/2007 | Haustein | G06F 3/0605 |
| 2012/0096459 A1 | * | 4/2012 | Miyazaki | G06F 9/45558 |
| | | | | 718/1 |
| 2016/0179435 A1 | * | 6/2016 | Haley | G06F 3/0647 |
| | | | | 711/162 |

* cited by examiner

*Primary Examiner* — David Yi
*Assistant Examiner* — Craig S Goldschmidt
(74) *Attorney, Agent, or Firm* — Amin, Turocy & Watson, LLP

(57) ABSTRACT

Data lifetime-aware migration is presented herein. A data sorting component can generate a list of data portions that have been sorted in ascending order of respective determined probabilities that the data portions will be deleted from a source storage device during a migration of the data portions from the source storage device to a destination storage device—the migration comprising copying at least a part of the data portions from the source storage device to the destination storage device. Further, a data lifetime-aware component can iteratively migrate, based on the list in the ascending order of the respective determined probabilities, at least the part of the data portions from the source storage device to the destination storage device.

20 Claims, 10 Drawing Sheets

DATA LIFETIME-AWARE MIGRATION

TECHNICAL FIELD

The subject disclosure generally relates to embodiments for data lifetime-aware migration.

BACKGROUND

Conventional storage technologies that migrate data from source to destination storage usually run migration operations in the background of normal storage operations. In this regard, storage migration can typically take months to complete, and for large storage clusters, year(s) to complete. During such prolonged period(s) of time, a user may delete a significant part of data that has already been migrated—resulting in wasted time and resources that have been used to migrate such data. Consequently, conventional storage technologies have had some drawbacks, some of which may be noted with reference to the various embodiments described herein below.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
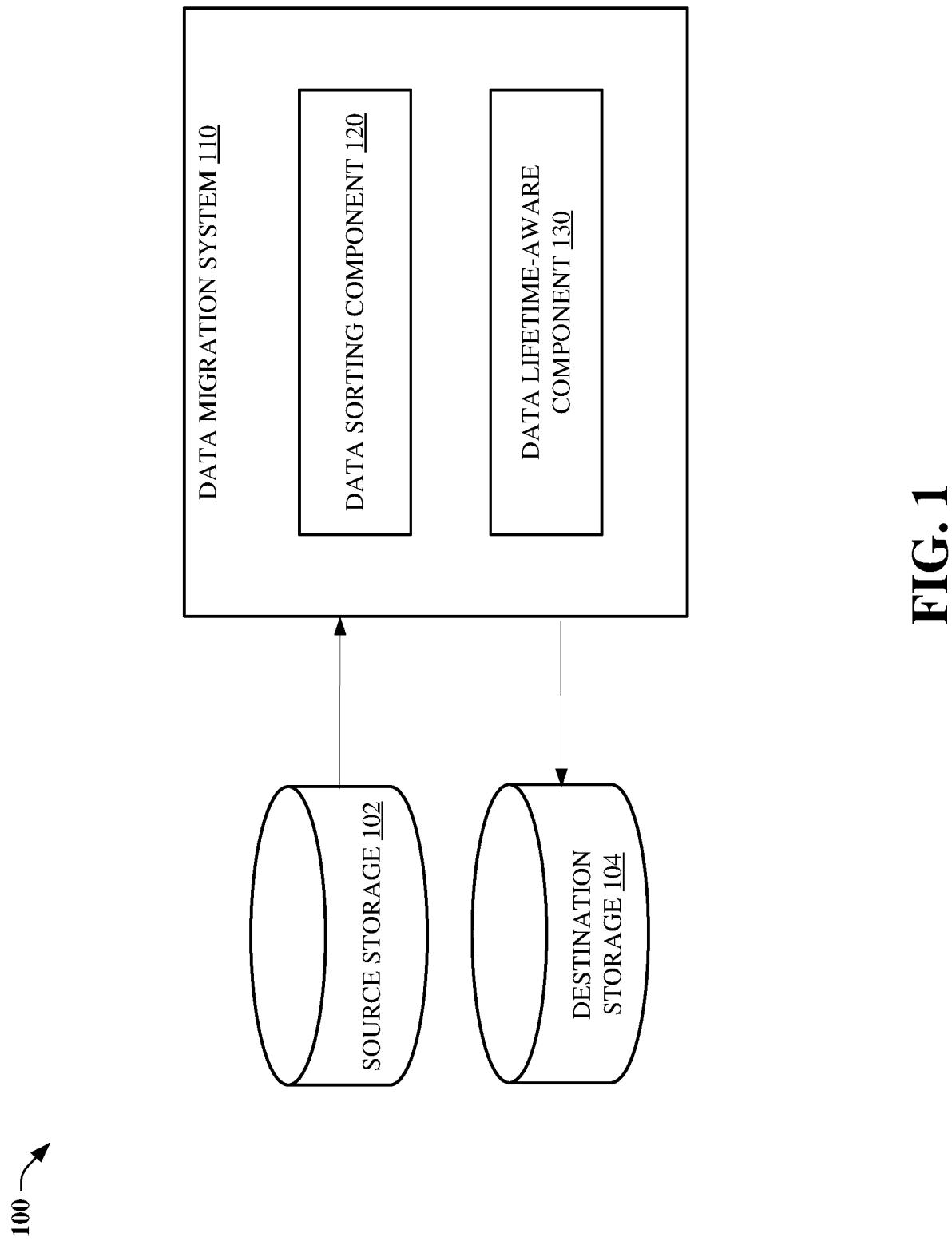
FIG. 1 illustrates a block diagram of a data migration system that facilitates lifetime-aware and/or lazy lifetime-aware push migration from source storage to destination storage, in accordance with various example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional storage technologies have had some drawbacks with respect to wasting time and resources by migrating data that is subsequently deleted from a source storage device before data migration from the source storage device has been completed. For example, if an initial scope of data to be migrated from the source storage device is reduced by 20% during migration, up to 20% of system resources devoted to migrating such data will be wasted, and an entire migration process will be unnecessarily extended in time by migrating such data. On the other hand, various embodiments disclosed herein can reduce storage system processing overhead and use of valuable storage device bandwidth by performing lifetime-aware and/or lazy lifetime-aware data migration.

For example, a data migration system, e.g., a host server, a client server, etc. can comprise a processor; and a memory that stores executable components that, when executed by the processor, facilitate performance of operations by the system, the executable components comprising: a data sorting component and a data lifetime-aware component that can facilitate lifetime-aware and/or lazy lifetime-aware data migration from a source storage device to a destination storage device, e.g., the source storage device and/or the destination storage device comprising physical storage device(s), virtual storage device(s), hard disk drive(s), cloud based storage device(s), etc.

In this regard, the data sorting component can generate a list of data portions, objects, streams, etc. that have been sorted in ascending order of respective determined probabilities that the data portions will be deleted from the source storage device during a migration of the data portions from the source storage device to the destination storage device—the migration comprising copying at least a part of the data portions from the source storage device to the destination storage device. Further, the data lifetime-aware component can iteratively migrate, based on the list in the ascending order of the respective determined probabilities, at least the part of the data portions from the source storage device to the destination storage device.

In this regard, in an embodiment, the data lifetime-aware component can migrate, during a lifetime-aware migration, a first data portion of the list corresponding to a first probability of the respective determined probabilities before migrating a second data portion of the list corresponding to a second probability of the respective determined probabilities that is greater than the first probability.

In another embodiment, the data sorting component can determine the respective determined probabilities that the data portions will be deleted from the source storage device during the lifetime-aware migration based on respective lifecycle policies for the data portions, e.g., the respective lifecycle policies specifying defined schedules of respective deletions, automatic deletions, expirations, etc. of the data portions from the source storage device.

In yet another embodiment, the data lifetime-aware component can determine, periodically determine, etc., e.g., during a lazy lifetime-aware migration, a time when the lazy lifetime-aware migration of the data portions is expected to be completed; and based on the time, iteratively migrate, in the ascending order using the list, at least the part of the data portions from the source storage device to the destination storage device.

In embodiment(s), the data lifetime-aware component can determine, periodically determine, etc., e.g., each hour, etc., e.g., during the lazy lifetime-aware migration, the time when the lazy lifetime-aware migration is expected to be completed based on a first reduction, or "burn-down", of a scope of the migration corresponding to, resulting from, etc. one or more data portions of the list that have been migrated thus far, and based on a second reduction of the scope of the lazy lifetime-aware migration corresponding to expired, deleted, etc. data portions of the list of data portions that have been deleted, automatically deleted, etc. from the source storage device, e.g., based on corresponding lifecycle policies of such data portions.

In this regard, in embodiment(s), the data lifetime-aware component can migrate, during the lazy lifetime-aware migration, first data portions of the sorted list having respective first schedules of deletion of the defined schedules of deletion that are after the time when the lazy lifetime-aware migration is expected to be completed, and refrain from, stop, suspend, etc. migration of second data portions of the sorted list having respective second schedules of deletion of the defined schedules of deletion that are before the time when the lazy lifetime-aware migration is expected to be completed.

In other embodiment(s), in response to a determination, by the data lifetime-aware component, that the sorted list is void of data portions having respective schedules of deletion of the schedules of deletion that are after the time when the lazy lifetime-aware migration is expected to be completed, the data lifetime-aware component can suspend the lazy lifetime-aware migration until the time when such migration is expected to be completed.

Further, in yet other embodiment(s), in response to a second determination, by the data lifetime-aware component, that, based on the time, the lazy lifetime-aware migration is complete, the data lifetime-aware component can notify a client device, e.g., the host server, the client server, etc. that the migration, e.g., lazy lifetime-aware migration, has been completed.

In an embodiment, a method can comprise: based on respective lifecycle policies for portions of data that have been stored in a first storage device, predicting, by a system comprising a processor, respective remaining lifetimes of the portions of data within the first storage device; generating, by the system, a list of the portions of data that have been sorted in descending order of the respective remaining lifetimes of the portions of data; and copying, by the system based on the list, at least a part of the portions of data from the first storage device to a second storage device in the descending order of the respective remaining lifetimes of the portions of data.

In one embodiment, the predicting comprises predicting the respective remaining lifetimes of the portions of data based on defined schedules indicating when the portions of data will expire, be deleted, etc. within the first storage device.

In another embodiment, the copying comprises determining, e.g., iteratively determining, based on a defined period, an estimate of a time of completion of the copying; and based on the estimate of the time of completion of the copying, copying at least the part of the portions of data from the first storage device to the second storage device in the descending order of the respective remaining lifetimes of the portions of data.

In yet another embodiment, the determining, iteratively determining, etc. the estimate of the time of completion of the copying comprises determining the estimate of the time of completion based on a first reduction of a scope of the copying due to progression of the copying, and based on a second reduction of the scope of the copying due to expiration of some of the portions of data within the first storage device.

In embodiment(s), the copying comprises: in response to the estimate of the time of completion of the copying being determined to be before a defined time with respect to expiration, deletion, etc. of at least the part of the portions of data, copying at least the part of the portions of data from the first storage device to the second storage device in the descending order.

In other embodiment(s), the at least the part of the portions of data is at least a first part of the portions of data, and the copying comprises: in response to the estimate of the time of completion of the copying being determined to be after a defined time with respect to expiration of at least a second part of the portions of data, suppressing migration of at least the second part of the portions of data—the second part different than the first part.

One embodiment can comprise a machine-readable storage medium comprising instructions that, in response to execution, cause a system comprising a processor to perform operations, comprising: generating a sorted group of objects that have been stored in a source storage device by sorting a group of objects in ascending order of respective probabilities that the objects will be deleted during copying of the objects from the source storage device to a destination storage device; and iteratively copying, in the ascending order, a first portion of the objects of the sorted group from the source storage device to the destination storage device.

In another embodiment, the operations can comprise: in response to a second portion of the objects of the sorted group being determined, based on the respective probabilities, to be scheduled for deletion before an estimated time of completion of the copying, suppressing copying of the second portion of the objects from the source storage device to the destination storage device.

In yet another embodiment, the iteratively copying further comprises: in response to the first portion of the objects of the sorted group being determined, based on the respective probabilities, to be scheduled for the deletion after the estimated time of completion of the copying, copying the first portion of the objects from the source storage device to the destination storage device.

As described above, conventional storage technologies have had some drawbacks with respect to an initial scope of migration of data being reduced during migration of the data. As storage migration solutions are normally designed to run in parallel with normal data traffic handling by a source/destination storage device, corresponding migration process(es) are throttled down. In turn, a migration process can take month(s), or even year(s) to complete.

During such a prolonged period(s) of time, a user may delete a significant part of the data from the initial migration scope. In this regard, although deletion of part(s) of data from source storage before the part(s) have been migrated to destination storage does not negatively impact use of system resources corresponding to a migration process since the deleted data hasn't been migrated, deletion of other part(s) of data from the source storage after such part(s) have been migrated to the destination storage, but before the migration process has completed, wastes system resources and migration time that were used to migrate such data to the destination storage.

Figure 2:
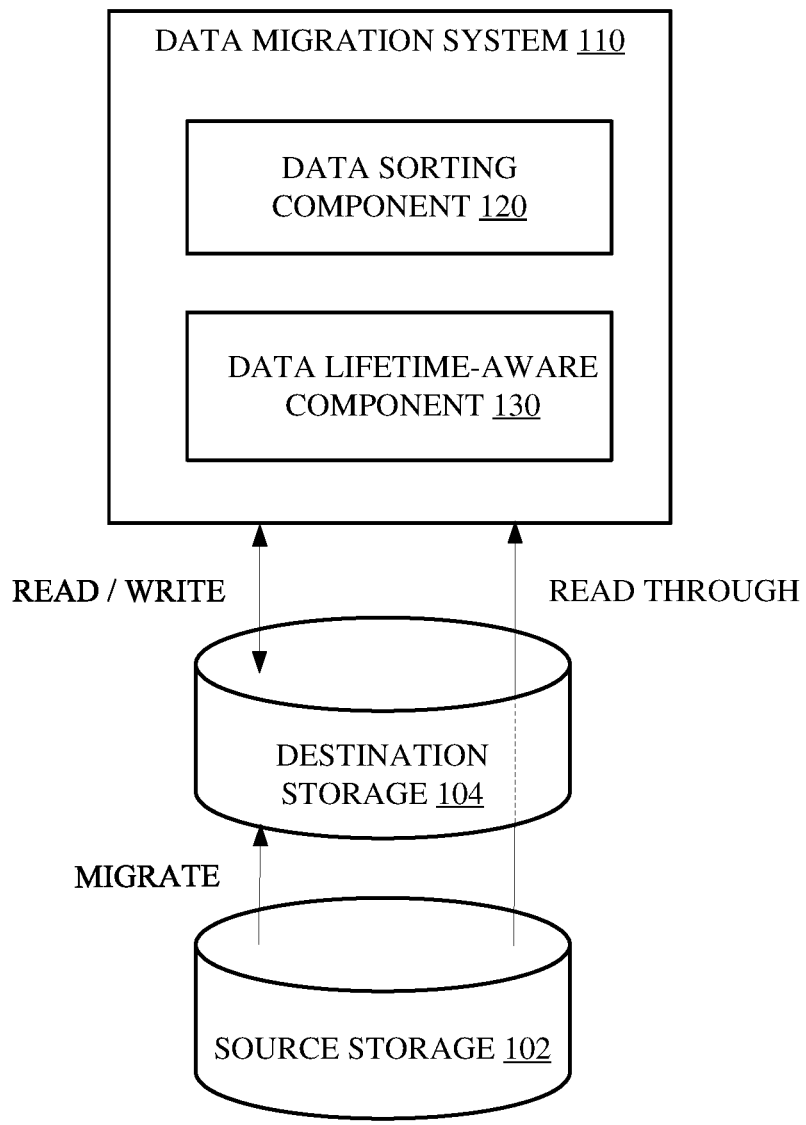
FIG. 2 illustrates a block diagram of a data migration system that facilitates lifetime-aware and/or lazy lifetime-aware pull migration from source storage to destination storage, in accordance with various example embodiments.

In contrast, various embodiments described herein can improve use of storage system resources and reduce migration processing overhead by performing data lifetime-aware migration. For example, and now referring to FIGS. 1 and 2, block diagrams of cloud-based data storage environments (100, 200) comprising a data migration system (110) for facilitating lifetime-aware and/or lazy lifetime-aware data migration are illustrated, in accordance with various example embodiments. In this regard, data migration system (110) can comprise an object storage system, e.g., a file system, comprising, but not limited to comprising, a Dell EMC® Isilon file storage system (900). In other embodiment(s), data migration system (110) can comprise a host server, a client server, etc. In yet other embodiment(s), various components of data migration system (110) can be included in a host application, a client application, etc.

Figure 9:
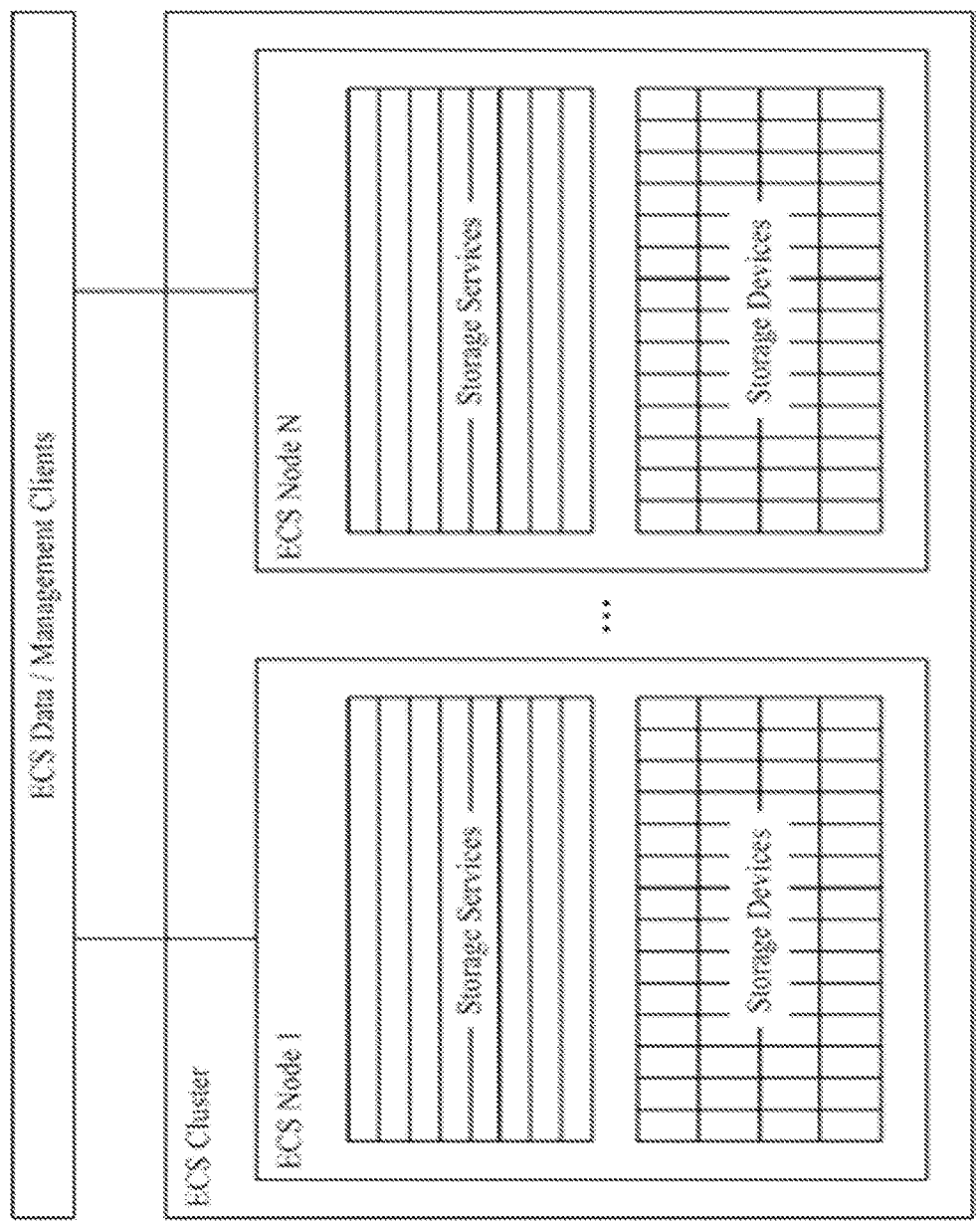
FIG. 9 illustrates a block diagram of an elastic cloud storage (ECS) system, in accordance with various example embodiments.

As illustrated FIG. 9, the Dell EMC® Isilon file storage system can comprise a cloud-based object storage appliance in which corresponding storage control software comprising, e.g., ECS data client(s), ECS management client(s), storage service(s), etc. and storage devices, storage media, etc., e.g., physical magnetic disk media, storage devices, etc. of respective ECS nodes of an ECS cluster, are combined as an integrated system with no access to the storage media other than through the ECS system.

As used herein, the term "cloud" can refer to a cluster, data storage cluster, etc. comprising a group of nodes, data storage nodes, etc., e.g., comprising a group of network servers (e.g., comprising storage devices, disk drives, etc.), within a distributed, e.g., globally distributed, storage system—the group of storage nodes being communicatively and/or operatively coupled to each other, and hosting a group of applications utilized for servicing user requests. In general, the storage nodes can communicate with user devices via wired and/or wireless communication network(s) to provide access to services that are based in the cloud and not stored locally, e.g., on a user device. A typical cloud-computing environment can include multiple layers, aggregated together, which interact with each other to provide resources for end-users.

The ECS system can support storage, manipulation, and/or analysis of unstructured data on a massive scale on commodity hardware. As an example, the ECS system can support mobile, cloud, big data, and/or social networking applications. In another example, the ECS system can be deployed as a turnkey storage appliance, or as a software product that can be installed on a set of qualified commodity servers and disks, e.g., within a node, data storage node, etc. of a cluster, data storage cluster, etc. In this regard, the ECS system can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the ECS system can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed and/or closed—becoming immutable, e.g., read-only and delete only.

It should be appreciated that in various embodiments disclosed herein with respect to migrating, copying, etc. data from source storage (102) to destination storage (104), such data is assumed to be immutable during migration, copy, etc. operations. Further, it should be appreciated that source storage (102) and destination storage (104) can comprise physical storage device(s), virtual storage device(s), hard disk drive(s), cloud based storage device(s), etc.

In embodiment(s), data migration system (110) of cloud-based data storage environment (100) can facilitate lifetime-aware and/or lazy lifetime-aware "push" migration from source storage (102) to destination storage (104) by reading data, e.g., immutable data, from source storage (102) and writing, or "pushing", the data to destination storage (104).

In other embodiment(s), data migration system (110) of cloud-based data storage environment (200) can facilitate lifetime-aware and/or lazy lifetime-aware "pull" migration from source storage (102) to destination storage (104) by "hiding" source storage (102) behind destination storage (104) during normal data traffic operations, e.g., read/write operations. In this regard, data migration system (110) can direct, switch, etc. storage clients to access destination storage (104) instead of source storage (102) during migration. In this regard, data migration system (110) can "pull" legacy data, e.g., immutable data, from source storage (102) in parallel with normal data traffic operations.

For example, in response to determining that a write request to write data has been received during the pull migration, data migration system (110) can facilitate writing the data to destination storage (104) instead of source storage (102). Further, in response to receiving a read request to read data, and in response to determining that the data has been migrated to destination storage (104), data migration system (110) can facilitate reading the data from destination storage (104). On the other hand, in response to determining that the data has not been migrated to destination storage (104), data migration system (110) can facilitate reading, via a "read through" feature, the data from source storage (102).

To address the above noted concerns of conventional storage technologies, the following provides context for various embodiment(s) disclosed herein that can reduce storage system processing overhead and use of valuable storage device bandwidth in a data migration environment by performing data lifetime-aware migration.

Many high-end storage products, e.g., Dell EMC® Isilon file storage system, support features of data lifecycle management (DLM). DLM facilitates specifying lifecycle/expiration policies for objects. Examples of lifecycle policies specified by organizations can include: keeping phone call records for 3 months and then deleting them; keeping paid bill scans for 3 years and then deleting them; keeping emails for 6 years then deleting them, etc.

Each of these policies can be applied to a set of objects, and corresponding storage systems can schedule automatic deletion of objects based on respective lifecycle policies of the objects, etc. Thus, the respective lifecycle policies can be used to predict remaining lifetimes of respective objects in a storage system.

For a storage migration use-case, the shorter an object's remaining lifetime, the higher the probability of the object being deleted during a migration process. For example, an object with 5 years of remaining lifecycle has a high chance to be alive after a migration process, e.g., estimated to be 2 years long, is completed. On the other hand, an object that is scheduled to be deleted the day after a migration process begins has minimal chances to survive storage migration. In this regard, a migration process should begin with objects having remaining lifetimes that are longer than other objects of the set of objects.

For example, assume the following data sets (A, B, C, D, E) are to be migrated:
Data set A with an expiration after 6 months;
Data set B with an expiration after 1 year;
Data set C with an expiration after 1 year and 6 months;
Data set D with an expiration after 2 years; and
Data set E with an expiration after 2 years and 6 months.

Further, suppose that migration of each data set takes 3 months. In this regard, migration of data sets in the order they are listed above (A, B, C, D, and E) requires migration of all 5 data sets. Such migration takes 1 year and 3 months. Note that by the moment the migration process is completed all the objects from data set A are already gone. Therefore, migration of data set A was a waste of resources.

Thus, in various embodiment(s), to facilitate conservation of storage resources and bandwidth, data migration system (110) comprises data sorting component (120) and data lifetime-aware component (130). Data sorting component (120) can generate a list of data portions, objects, streams, etc. that have been sorted in ascending order of respective determined probabilities that the data portions will be deleted from source storage (102) during a migration, e.g., a lifetime-aware migration, a lazy-lifetime-aware migration, etc. of the data portions from source storage (102) to destination storage (104).

In other embodiment(s), data sorting component (120) can determine the respective determined probabilities that the data portions will be deleted from source storage (102) during the migration based on respective lifecycle policies for the data portions—the respective lifecycle policies specifying, for example, remaining lifetimes of the data portions, defined schedules of deletion, automatic deletion, expiration, etc. of the data portions from source storage (102), etc. In this regard, data sorting component (120) can generate a list, group, etc. of data portions, objects, streams, etc. that have been sorted in descending order of remaining lifetimes of the data portions, etc.

In turn, data lifetime-aware component (130) can iteratively migrate, based on the list, group, etc. in the ascending order of the respective determined probabilities, or in the descending order of remaining lifetimes of the data portions, at least part of the data portions from source storage (102) to destination storage (104), e.g., via a lifetime-aware migration.

In this regard, the lifetime-aware migration of the set of objects can be performed in the following order: E, D, C, B, and A. In turn, when the lifetime-aware migration is performed in this order, only 4 data sets are to be migrated because by the time migration reaches data set A, all the objects from data set A are deleted, expired, etc. Consequently, the entire lifetime-aware migration takes only 1 year, and allowed reduction of migration workload and migration duration by at least 20%.

Figure 3:
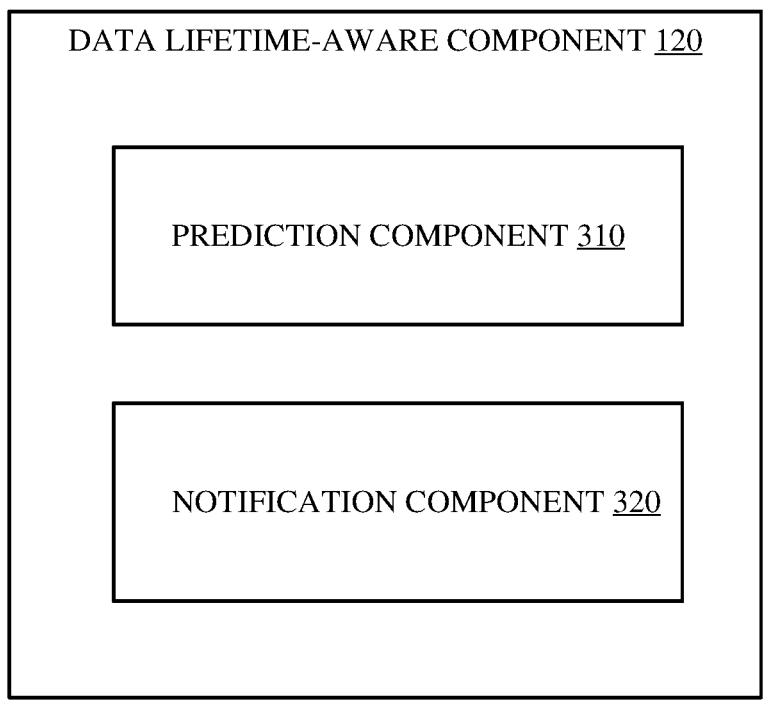
FIG. 3 illustrates a block diagram of a data lifetime-aware component that facilitates lazy lifetime-aware migration, in accordance with various example embodiments.

Referring not to FIG. 3, a block diagram of a data lifetime-aware component configured to perform lazy lifetime-aware migration is illustrated, in accordance with various example embodiments. In this regard, the lazy lifetime-aware migration facilitates further reduction of migration workload, but typically not a duration of the migration.

Given the migration example described above, as data objects from data set B expire just at the moment the lifetime-aware migration process is completed, such migration is a waste of migration workload, resources, etc. To further reduce such storage processing workload, data life-time-aware component can further withhold from performing migration on data objects determined to expire within a defined period of time from an estimated time of completion of the migration—effectively holding up migration for the data objects until they are all expired. For example, data lifetime-aware component can migrate data sets that have expiration dates that have been determined to be later than the estimated time of completion of the migration, and not perform migration for data set(s) that have been determined to have expiration dates that are earlier, or coincide with, the estimated time of completion of the migration.

In this regard, in embodiment(s), prediction component (310) can determine, iteratively determine, periodically determine, etc., e.g., during a lazy lifetime-aware migration, a time when the lazy lifetime-aware migration of the data portions is expected to be completed; and based on the time, iteratively migrate, in the ascending order using the list, group, etc. based on the respective determined probabilities, or in the descending order using the list, group, etc. based on the remaining lifetimes of the data portions, at least the part of the data portions from source storage (102) to destination storage (104).

In other embodiment(s), prediction component (310) can determine, iteratively determine, periodically determine, e.g., each hour, etc., e.g., during the lazy lifetime-aware migration, the time when the lazy lifetime-aware migration is expected to be completed based on a burn-down, or reduction, in a scope of the lazy lifetime-aware migration corresponding to, resulting from, etc. portion(s) of the list, group, etc. that have been migrated thus far, and further based on a second reduction of the scope of the lazy lifetime-aware migration corresponding to expired, deleted, etc. data portions of the list, group, etc. of data portions that have been deleted, automatically deleted, etc. from source storage (102), e.g., based on corresponding lifecycle policies of such data portions.

In this regard, in embodiment(s), data lifetime-aware component (120) can migrate, during the lazy lifetime-aware migration, first data portions of the sorted list having respective first schedules of deletion of the defined schedules of deletion that are after the time when the lazy lifetime-aware migration is expected to be completed, and refrain from, stop, suspend, etc. migration of second data portions of the sorted list having respective second schedules of deletion of the defined schedules of deletion that are before the time when the lazy lifetime-aware migration is expected to be completed.

In other embodiment(s), in response to a determination, by data lifetime-aware component (120), that the sorted list is void of data portions having respective schedules of deletion that are after the time when the migration is expected to be completed, data lifetime-aware component (120) can suspend the migration until the time when such migration is expected to be completed.

Further, in yet other embodiment(s), in response to a determination, by notification component (320) based on the time, that the migration is complete, notification component (320) can notify a client device, e.g., the host server, the host application, the client server, the client application, etc. that the migration, e.g., lazy lifetime-aware migration, has been completed.

Referring again to the migration example described above, in which the data sets were sorted in descending order of expiration time (E, D, C, B, A), prediction component (310) can further determine, calculate, etc., under lazy lifetime-aware migration, e.g., at the start of migration based on a determination that migration of each data set takes 3 months to complete, an expected migration completion time of 1 year.

In turn, data lifetime-aware migration component (120) can perform migration for data sets E, D, and C because their expiration dates are after the expected migration completion time. Further, data lifetime-aware migration component (120) does not perform migration for data set B because its expiration time coincides with the expected migration completion time. Instead, data lifetime-aware migration component (120) suspends migration until the moment of the expected migration completion time.

Although the lazy lifetime-aware migration completed in the same amount of time as the lifetime-aware migration, only 3 data sets were migrated under lazy lifetime-ware migration compared to 4 data sets being migrated under lifetime-aware migration. In this regard, although the lazy lifetime-aware migration reduced migration duration by 20% as accomplished by the lifetime-aware migration, workload was reduced under lazy lifetime-aware migration by 40%, compared with a 20% reduction in workload achieved under lifetime-aware migration.

FIGS. 4-8 illustrate methodologies for performing operations corresponding to cloud-based data storage environments (100, 200), in accordance with various example embodiments. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
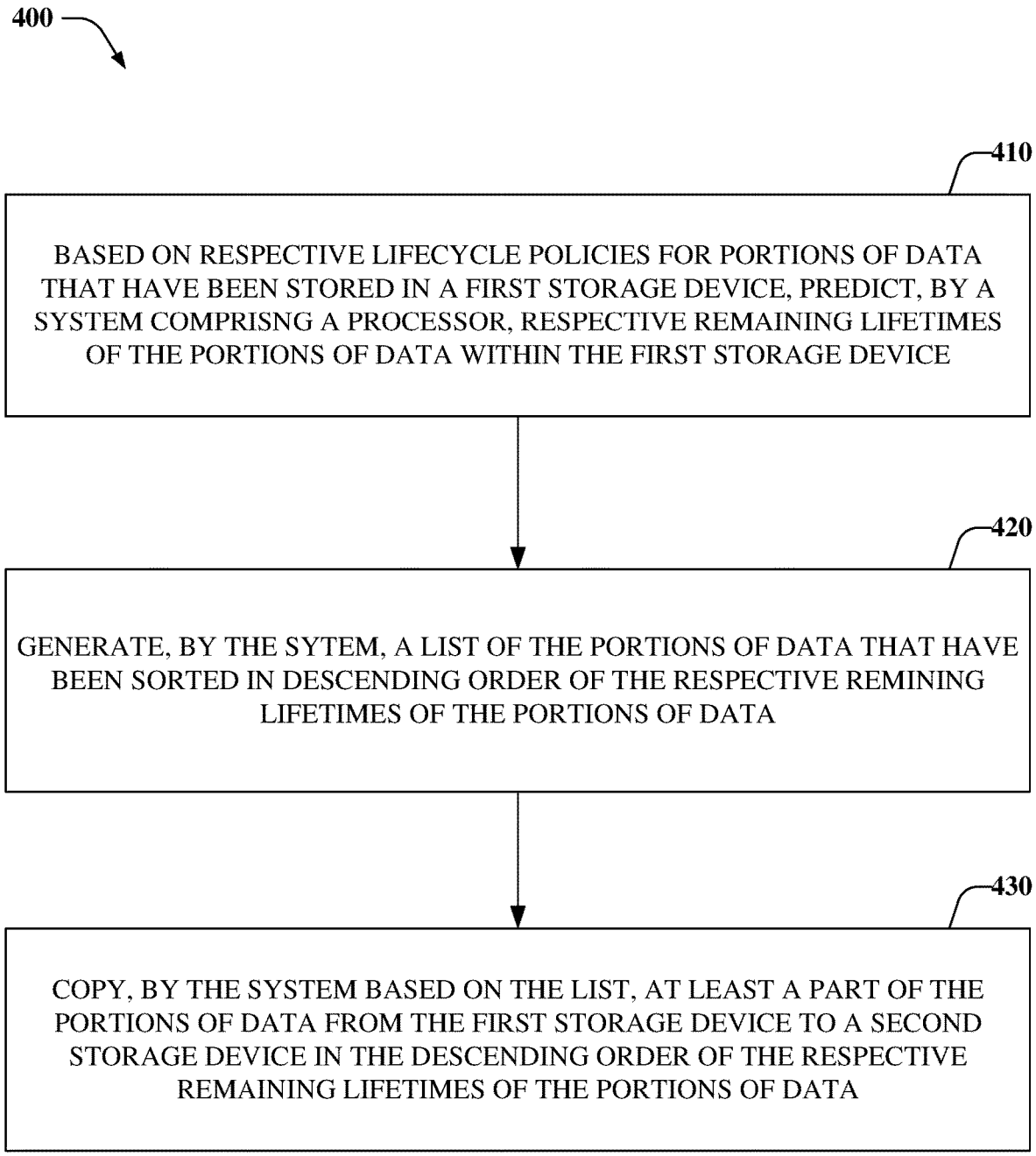
FIG. 4 illustrates flow chart of a method associated with lifetime-aware data migration, in accordance with various example embodiments.

Referring now to FIG. 4, a method associated with lifetime-aware data migration is illustrated, in accordance with various example embodiments. At 410, a system comprising a processor (e.g., 110) can predict, determine, etc., based on respective lifecycle policies for portions of data that have been stored in a first storage device, respective remaining lifetimes of the portions of data within the first storage device. At 420, the system can generate a list of the portions of data that have been sorted in descending order of the respective remaining lifetimes of the portions of data. At 430, based on the list, the system can copy at least a part of the portions of data from the first storage device to a second storage device in the descending order of the respective remaining lifetimes of the portions of data.

Figure 5:
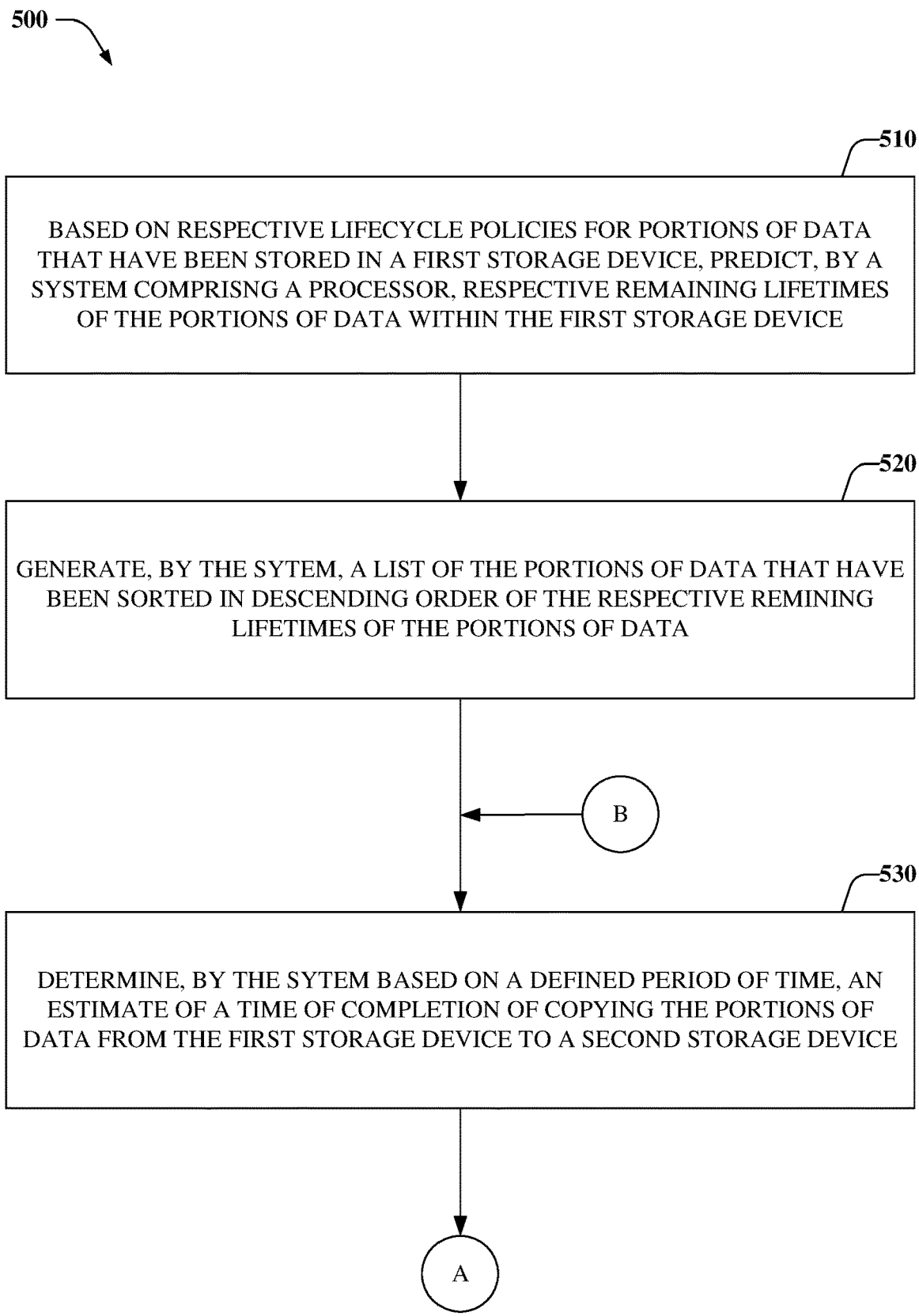
FIGS. 5-7 illustrate flow charts of a method associated with lazy lifetime-aware data migration, in accordance with various example embodiments.
Figure 6:
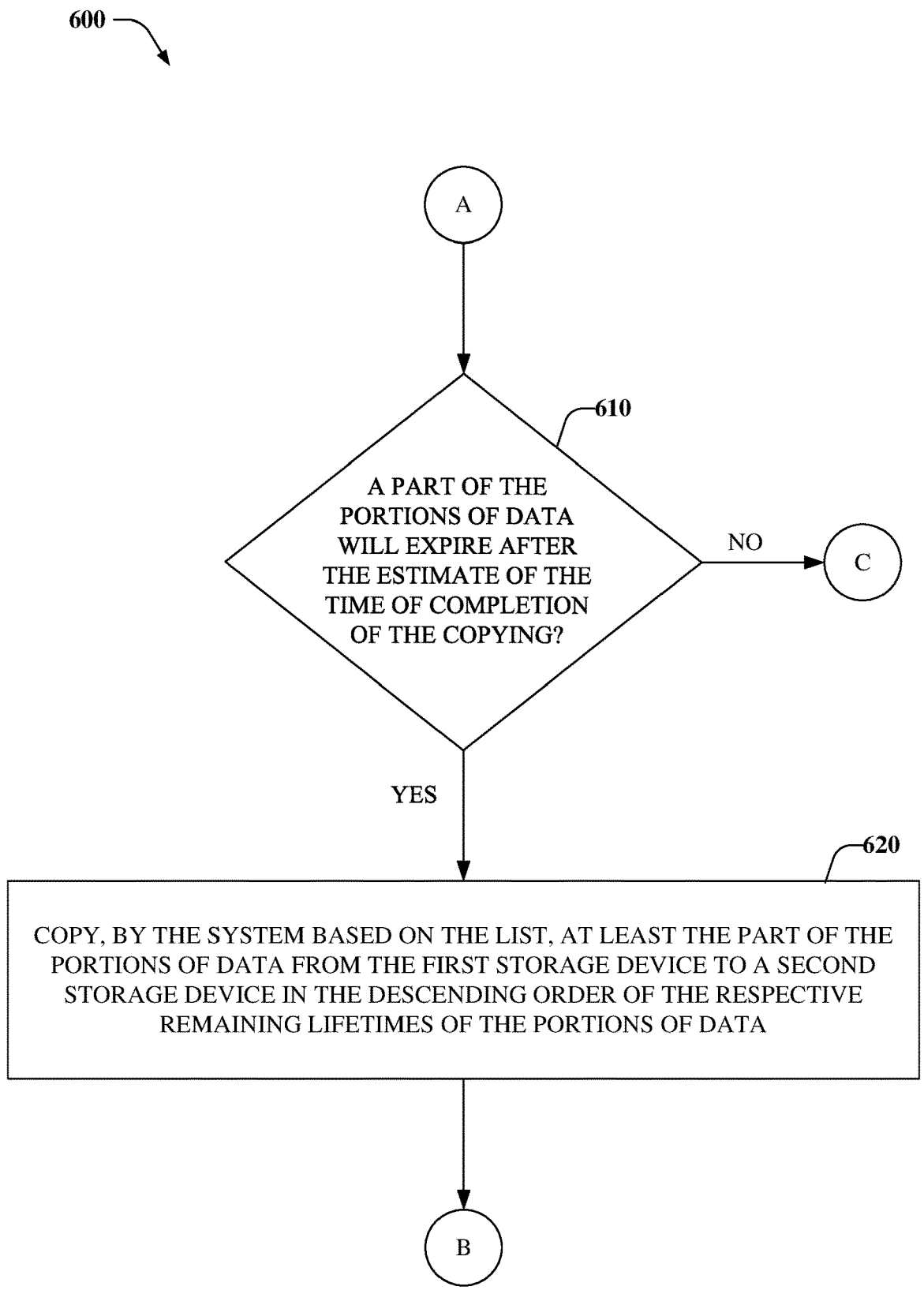
Figure 7:
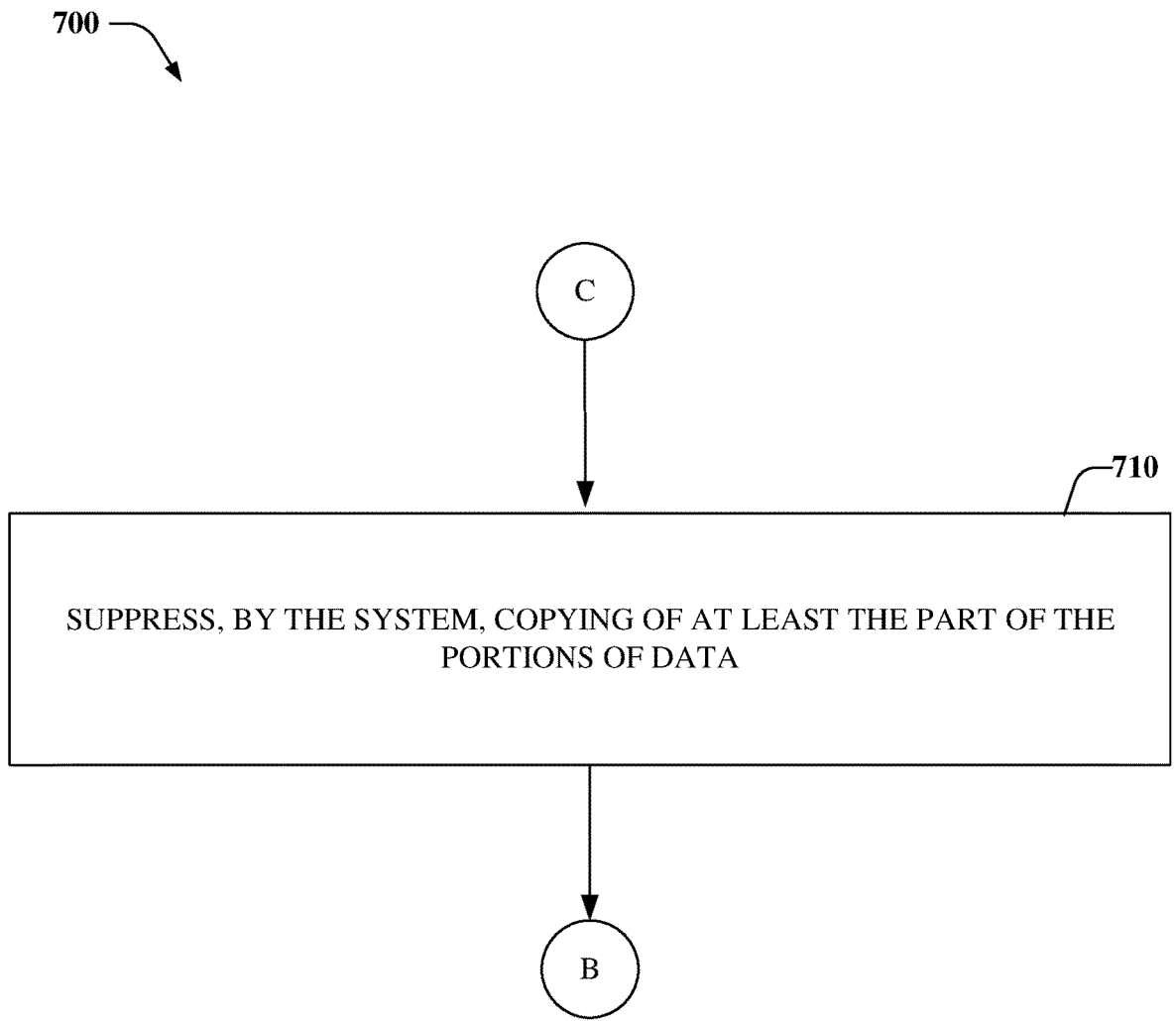

Referring now to FIGS. 5-7, a method associated with lazy lifetime-aware data migration is illustrated, in accordance with various example embodiments. At 510, based on respective lifecycle policies for portions of data that have been stored in a first storage device, a system (e.g., 110) can predict respective remaining lifetimes of the portions of data within the first storage device. At 520, the system can generate a list of the portions of data that have been sorted in descending order of the respective remaining lifetimes of the portions of data. At 530, the system can determine, periodically determine, etc., based on a defined period of time, an estimate of a time of completion of copying, migrating, etc. the portions of data from the first storage device to a second storage device.

At 610, it can be determined whether a part of the portions of data will expire after the estimate of the time of completion of the copying, migrating, etc. In this regard, if it has been determined that at least the part of the portions will expire after the estimate of the time of completion of the copying, migrating, etc., flow continues to 620, at which the system can copy, migrate, etc., based on the list, at least the part of the portions of data from the first storage device to a second storage device in the descending order of the respective remaining lifetimes of the portions of data. Flow continues from 620 to 530.

At 610, if it has been determined that at least an other part of the portions will not expire after the estimate of the time of completion of the copying, migrating, etc., flow continues to 710, at which the system can suppress, withhold from, etc. copying, migrating, etc. at least the other part of the portions of data. Flow continues from 710 to 530.

Figure 8:
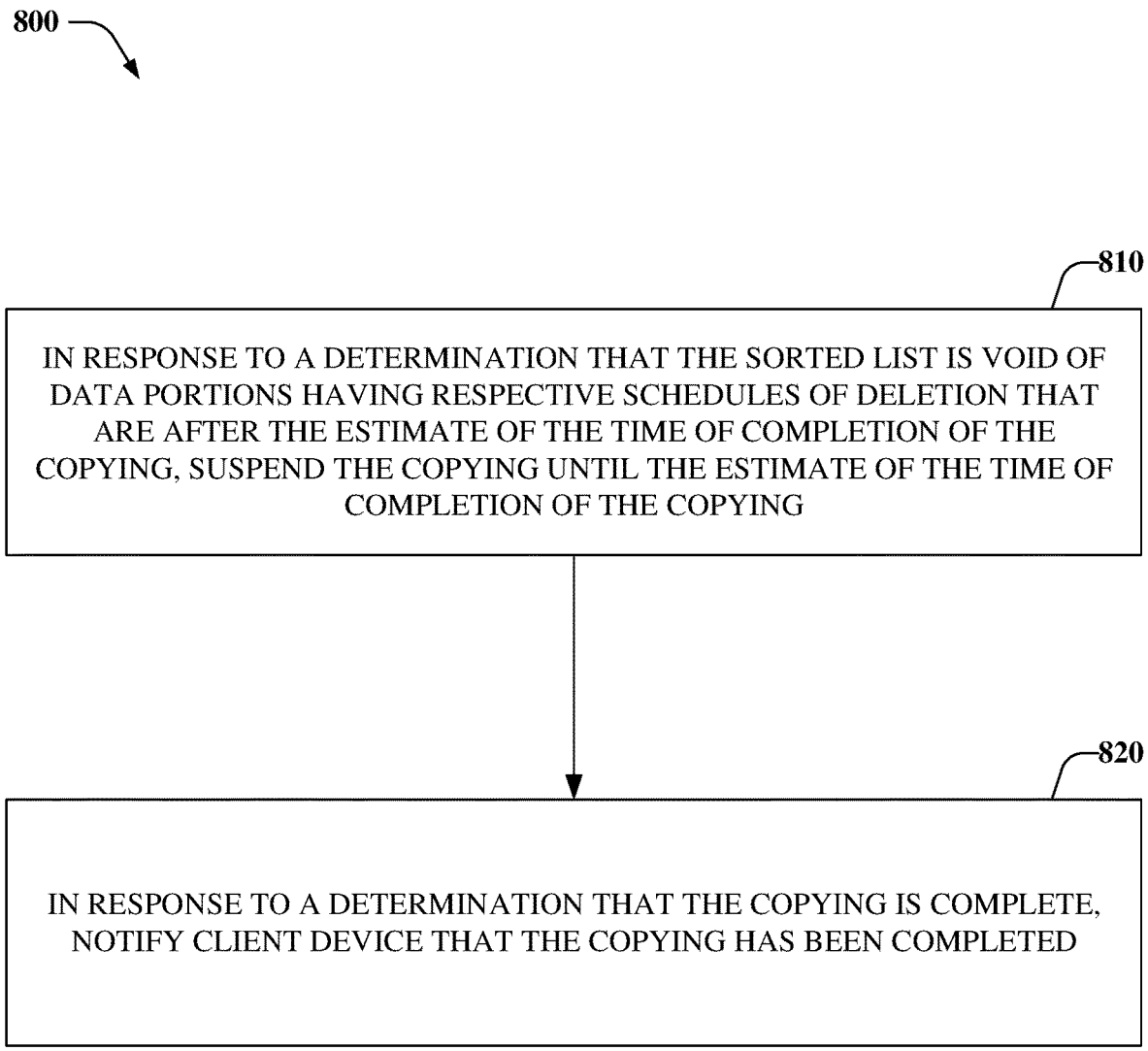
FIG. 8 illustrates a flow chart of a method associated with completion of lifetime-aware and/or lazy lifetime aware data migration, in accordance with various example embodiments.

FIG. 8 illustrates a flow chart of a method associated with completion of lifetime-aware and/or lazy lifetime aware data migration, in accordance with various example embodiments. At 810, in response to a determination, by the system, that the sorted list is void of data portions having respective schedules of deletion that are after the estimate of the time of completion of the copying, migrating, etc., the system can suspend the copying, migrating, etc. until the estimate of the time of completion of the copying, migrating, etc.

At 820, in response to a determination, by the system, that the copying, migrating, etc. is complete, the system can notify a client device, system, server, application, etc. that the copying has been completed.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic", "logical", "logically", and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component", "system", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via data sorting component (120), to generate a list of data portions that have been sorted in ascending order of respective determined probabilities that the data portions will be deleted from a source storage device during a migration of the data portions from the source storage device to a destination storage device, as described herein.

A classifier can be a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions, e.g., performed by data migration system 110.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "source storage", "destination storage", "storage device", "storage medium", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in source storage (102), destination storage (104), non-volatile memory 1022 (see below), disk storage 1024 (see below), and/or memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory 1020 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
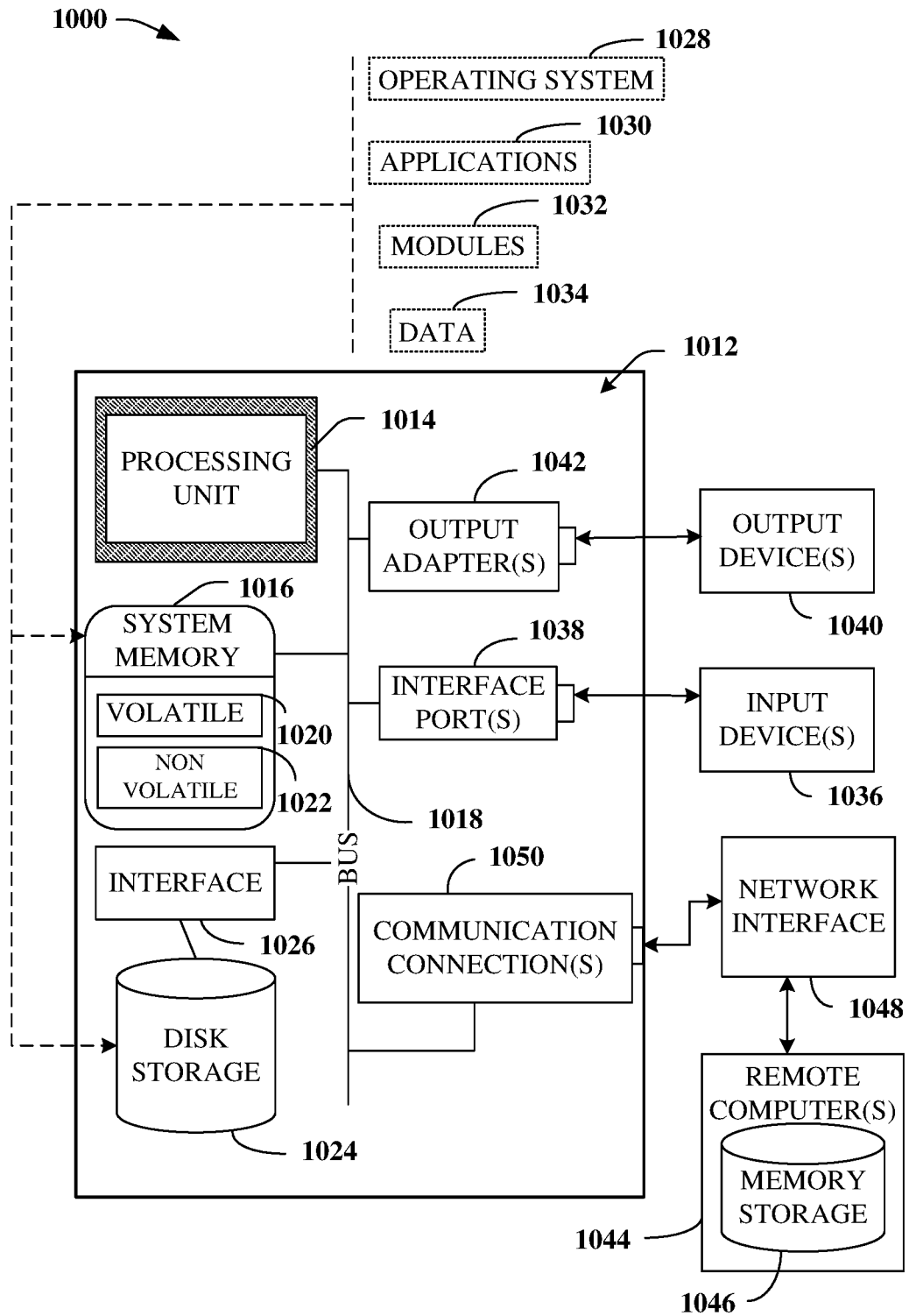
FIG. 10 illustrates a block diagram representing an illustrative non-limiting computing system or operating environment in which one or more aspects of various embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 10, a block diagram of a computing system 1000, e.g., data recovery system 110, operable to execute the disclosed systems and methods is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable components that, when executed by the processor, facilitate performance of operations by the system, the executable components comprising:
a data sorting component that generates a list of data portions that have been sorted in ascending order of respective determined probabilities that the data portions will be deleted from a source storage device before an expected completion time for a migration of the data portions from the source storage device to a destination storage device, wherein a first data portion of the data portions of the list comprises a first probability of the respective determined probabilities and represents a first remaining lifetime of the first data portion within the source storage device that is less than a second remaining lifetime of a second data portion of the data portions of the list that comprises a second probability of the respective determined probabilities that is less than the first probability, and wherein the migration comprises copying at least the second data portion from the source storage device to the destination storage device; and
a data lifetime-aware component that
iteratively migrates at least the second data portion from the source storage device to the destination storage device, and
refrains from performing the migration on the first data portion, wherein the first data portion has been determined to expire within a defined period of time before the expected completion time for the migration.

2. The system of claim 1, wherein the data lifetime-aware component migrates the second data portion before migrating the first data portion.

3. The system of claim 1, wherein the data sorting component determines the respective determined probabilities that the data portions will be deleted from the source storage device during the migration based on respective lifecycle policies for the data portions.

4. The system of claim 3, wherein the respective lifecycle policies specify defined schedules of respective deletions of the data portions from the source storage device.

5. The system of claim 4, wherein the data lifetime-aware component:
based on the expected completion time for the migration, iteratively migrates, in the ascending order using the list, at least the second data portion from the source storage device to the destination storage device.

6. The system of claim 5, wherein the data lifetime-aware component determines the expected completion time for the migration based on a first reduction of a scope of the migration corresponding to one or more data portions of the list that have been migrated.

7. The system of claim 6, wherein the data lifetime-aware component determines the expected completion time for the migration based on a second reduction of the scope of the migration corresponding to expired data portions of the list of data portions that have been deleted from the source storage device.

8. The system of claim 5, wherein the data lifetime-aware component migrates first data portions of the list having respective first schedules of deletion of the defined schedules of respective deletions that are after the expected completion time for the migration.

9. The system of claim 5, wherein in response to a determination that the list is void of some data portions having respective schedules of deletion of the defined schedules of respective deletions that are after the expected completion time for the migration, the data lifetime-aware component suspends the migration until the expected completion time for the migration.

10. The system of claim 9, wherein the determination is a first determination, and wherein in response to a second determination, based on the expected completion time for the migration, that the migration is complete, the data lifetime-aware component notifies a client device that the migration has been completed.

11. A method, comprising:
generating, by a system comprising a processor, a list of portions of data that have been sorted in ascending order of respective determined probabilities that the portions of data will be deleted from a first storage device before an estimate of a time of completion of copying the portions of data from the first storage device to a second storage device, wherein a first part of the portions of data comprises a first probability of the respective determined probabilities representing a first remaining lifetime of the first part of the portions of data within the first storage device, wherein a second part of the portions of data comprises a second probability of the respective determined probabilities representing a second remaining lifetime of the second part of the portions of data within the first storage device, wherein the second probability is less than the first probability, and wherein the first remaining lifetime of the first part of the portions is less than the second remaining lifetime of the second part of the portions of data;

determining, by the system, the estimate of the time of completion of the copying; and based on the list,
- copying, by the system, at least the second part of the portions of data from the first storage device to a second storage device, and
- in response to determining that the first part of the portions of data will expire within a defined period of time before the estimate of the time of completion of the copying, refraining, by the system, from copying the first part of the portions of data from first storage device to the second storage device.

12. The method of claim 11, further comprising predicting, by the system, a group of respective remaining lifetimes of the portions of data based on defined schedules indicating when the portions of data will expire within the first storage device, wherein the group of respective remaining lifetimes comprises the first remaining lifetime and the second remaining lifetime.

13. The method of claim 11, wherein the copying comprises:
based on the estimate of the time of completion of the copying, copying at least the first part of the portions of data from the first storage device to the second storage device.

14. The method of claim 13, wherein the determining the estimate of the time of completion of the copying comprises:
determining the estimate of the time of completion based on a first reduction of a scope of the copying due to progression of the copying and a second reduction of the scope of the copying due to expiration of some of the portions of data within the first storage device.

15. The method of claim 13, wherein the copying comprises:
in response to the estimate of the time of completion of the copying being determined to be before a defined time with respect to expiration of at least the first part the portions of data, copying at least the first part of the portions of data from the first storage device to the second storage device.

16. The method of claim 11, further comprising:
delaying, by the system, a notification of a completion of the copying of the objects from being sent to a client device until the estimated time of completion of the copying of the objects.

17. A machine-readable storage medium comprising instructions that, in response to execution, cause a system comprising a processor to perform operations, comprising:

generating a sorted group of objects that have been stored in a source storage device by sorting a group of objects in ascending order of respective probabilities that the objects will be deleted during copying of the objects from the source storage device to a destination storage device, wherein a first portion of the objects comprises a first probability of the respective probabilities and represents a first remaining lifetime of the first portion of the objects within the source storage device that is less than a second remaining lifetime of a second portion of the objects, wherein the second portion of the objects comprises a second probability of the respective probabilities that is less than the first probability;

based on the list, iteratively copying the second portion of the objects from the source storage device to the destination storage device; and in response to the first portion of the objects being determined to be scheduled for deletion within a defined period of time before an estimated time of completion of the copying of the objects from the source storage device to the destination storage device, refraining from copying the first portion of the objects from the source storage device to the destination storage device.

18. The machine-readable storage medium of claim 17, wherein the copying of the objects comprises:
in response to the first portion of the objects of the sorted group being determined, based on the respective probabilities, to be scheduled for deletion after the estimated time of completion of the copying of the objects from the source storage device to the destination storage device, copying the first portion of the objects from the source storage device to the destination storage device.

19. The machine-readable storage medium of claim of claim 17, wherein the operations further comprise:
determining the respective probabilities that the objects will be deleted based on defined automatic deletions of the objects from the source storage device.

20. The machine-readable storage medium of claim 17, wherein the operations further comprise:
suppressing notifying a client device that the copying of the objects has been completed until the estimated time of completion of the copying of the objects.

* * * * *